2,709,187

PROCESS FOR PREPARING CARBON FLUORIDES FROM CARBON AND A FLUORIDE OF A METAL FROM GROUP II-B

Mark W. Farlow, Holly Oak, and Earl L. Muetterties, Hockessin, Del., assignors to E. I. du Pont de Nemours & Company, Wilmington, Del., a corporation of Delaware No Drawing. Application February 16, 1954, Serial No. 410,721

7 Claims. (Cl. 260—653)

This invention relates to a new process for preparing compounds of fluorine and carbon.

Compounds containing only carbon and fluorine (hereinafter referred to as fluorocarbons for the sake of brevity) are known to possess considerable usefulness in many fields of applied chemistry. For example, they have demonstrated utility as dielectrics, intermediates for plastics, refrigerant liquids, ingredients of insecticidal compositions, e. g., as propellants, etc. In particular, tetrafluoroethylene has already achieved commercial success in the form of its polymer. However, the lack of an economical synthesis has hindered the development of more extensive markets for fluorocarbons.

This invention has as an object a new method for the preparation of fluorocarbons. Other objects will appear hereinafter.

These objects are accomplished by the present invention wherein carbon is reacted, at a temperature of at least 500° C. and preferably in an inert atmosphere with an element of group II-B of the periodic table and the resulting fluorocarbons are isolated. The fluorides employed in the present invention are zinc, cadmium, and mercury fluorides. They may be employed singly or in combination. In the reaction, they are the essential source of the fluorine in the resultant fluorocarbon composition.

The process of this invention is conveniently carried out by heating an intimate mixture of carbon and the group II-B metal fluoride in a suitably disposed apparatus to a temperature of at least 500° C., and passing the gaseous reaction products through cold condensers to liquefy the fluorocarbons. If desired, a stream of inert gas such as nitrogen is passed through the reactor to help remove the gaseous reaction products. Another mode of operation consists in dropping the molten inorganic fluoride onto finely divided carbon heated to the reaction temperature in a suitable reactor, or subliming or distilling the inorganic fluoride over the hot carbon. In still another embodiment, the inorganic fluoride is reacted with the carbon electrodes of a carbon arc, where the temperature is estimated to be in the range of 2500 to 3500–4000° C. This can be done, for example, by immersing the arc in the molten inorganic fluoride, or, if the fluoride is sufficiently volatile, by forcing its vapors through the carbon arc which for this purpose might conveniently have one or both electrodes hollow.

Reaction takes place to some extent at temperatures as low as 400° C. but, for practical purposes, a temperature of at least 500° C. is desirable. The reaction temperature can be as high as can practically be obtained by known means. Extremely high temperatures, such as those that can be achieved by use of the carbon arc, represent a desirable embodiment since they often lead to high conversions to the extremely valuable tetrafluoroethylene. With more conventional equipment, temperatures in the range of 500 to 1200° C. are preferred.

Any form of carbon, whether amorphous or crystalline, is suitable for the purpose of this invention. Thus, there can be used coal, graphite, charcoal, the various forms of carbon black such as lamp black, acetylene black, gas black, channel black, bone black, etc. At the lower temperatures, e. g., 500–1200° C., the best results are obtained with active carbon, of which many well-known varieties are available commercially. In general, active carbon is very finely divided, porous carbon having a total surface area of at least 20 square meters per gram (Hassler, "Active Carbon," Chemical Publishing Co. (1951), p. 127). When using the carbon arc, the activity or state of subdivision of the carbon is apparently of no consequence, but the carbon must, of course, possess sufficient conductivity. The carbon need not be rigorously pure and it may, for example, contain the normal amount of ash, e. g., from 0.5 to 4% by weight in the case of most active carbons.

The metal fluorides suitable for the purposes of this invention, i. e., the fluorides of the elements of group II-B of the periodic table, can be prepared by methods described in the literature, or are available commercially. These fluorides are obtainable without having to resort to the use of free fluorine, and are therefore more readily and economically accessible than the fluorides of other elements.

Both reactants, that is, the carbon and the inorganic fluoride, should preferably be substantially anhydrous, although the reaction can tolerate the presence of some water. Thus, those fluorides which normally contain water of crystallization should be dehydrated prior to use. It is also often desirable to dehydrate the carbon prior to reaction, since carbon, especially of the active or absorbent variety, can retain significant amounts of water even at high temperature.

While the relative proportions of the two reactants are not critical insofar as the course of the reaction is concerned, it is obviously desirable for economic reasons to have the carbon present in excess, in order to utilize as much as possible of the more expensive inorganic fluoride. Thus, it is preferred to use the two reactants in such proportions that there is present at least 0.25 gram atom, preferably between 1 and 5 gram atoms, of carbon per gram atom of fluorine. There can be used up to 20 gram atoms of carbon per gram atom of fluorine or even more.

The reaction usually gives a mixture of fluorocarbons, the preponderant constituent of which is in general carbon tetrafluoride, with lesser amounts of other saturated fluorocarbons, e. g., the perfluorinated hydrocarbons from ethane to pentane, and/or unsaturated fluorocarbons such as tetrafluoroethylene. In addition, the crude reaction product may contain some unreacted inorganic fluoride, which can be recycled, and the free element whose fluoride was employed, or compounds thereof. The fluorocarbons can be isolated, for example, by passing the gaseous reaction mixture through cold condensers and fractionating the condensate through suitable distilling columns. If desired, the gaseous reaction product can be circulated through cold baffles to retain any material which is solid at that temperature, or it can be passed through liquid scrubbing solutions to separate the unchanged inorganic fluoride and the element formed during the reaction. It is usually desirable to effect rapid cooling of the reaction products to avoid side reactions or polymerizations at the high temperatures used. This is particularly the case when very high temperatures, as in the carbon arc, are employed. In such cases, and especially if tetrafluoroethylene is desired as the principal reaction product, very rapid quenching of the reaction mixture is recommended.

The reaction can be carried out at any desired pressure, which is normally the atmospheric pressure but can be higher or lower.

The following examples in which parts are by weight are illustrative of the invention.

Example I

A platinum-lined nickel tube was charged with a mixture of 150 parts of anhydrous mercury II fluoride and 20 parts of carbon black, and the ends of the tube were packed with a total of 3 parts of carbon black. The tube was placed in a copper reactor connected to glass traps cooled in liquid nitrogen. The reactor was heated to 564° C. and a slow stream of nitrogen was passed through it while the temperature was slowly raised to 783° C. over a period of two hours. There was obtained in the cold traps 20 parts of fluorocarbons, representing a conversion of about 70%. These fluorocarbons were separated by fractional distillation and identified by their boiling points and infrared spectra. The mixture consisted of carbon tetrafluoride, perfluoroethane, perfluoropropane, perfluorobutane, and perfluoropentane in the approximate molar ratio of 70:10:1:0.7:0.1.

Example II

A copper reaction tube similar in design to the nickel reactor used in Example I was charged with an intimate mixture of 20 parts of mercury II fluoride and 20 parts of carbon black. A slow stream of nitrogen was passed through the reactor heated at a temperature in the range of 400–575° C. for a period of two hours. The condensate was shown by infrared analysis to contain carbon tetrafluoride and perfluoroethane in a 2:1 molar ratio.

Example III

In this example, mercury II fluoride was reacted with the carbon electrodes of a carbon arc as follows: The anode was a graphite crucible containing the mercury II fluoride, and the cathode was a graphite cylinder 5/16 inch in diameter and 3 inches long with a 0.1 inch hole running longitudinally therethrough to allow passage of the gaseous reaction products. The electrodes were mounted in a water-cooled, gas-tight glass jacket in which an argon pressure of a few millimeters of mercury was maintained. The gaseous reaction products left the reaction chamber through the hollow cathode, which was connected to a trap cooled with liquid nitrogen. A direct current voltage of about 20 volts was applied across the electrodes, the arc was struck by contacting the electrodes momentarily, and the electrode gap was adjusted to produce a current of about 20 amperes. The mercury II fluoride vaporized and reacted rapidly, and the reaction products were collected in the cold trap. The volatile reaction product was found by infrared spectrographic analysis to contain tetrafluoroethylene and carbon tetrafluoride in the molar ratio of about 10:3.

While the foregoing examples have illustrated the use of mercury II fluoride, there can be used in the process of this invention the fluorides of any of the three elements of Group II–B of Deming's Periodic Table. Other suitable specific fluorides in this class include zinc fluoride, cadmium fluoride, and mercury I fluoride. The most useful fluoride for use in the process of this invention is mercury II fluoride.

The periodic table as referred to in the specification and claims is that published in Deming's "Chemical Chemistry," 5th ed., John Wiley & Sons, publishers. This table is used in many other reference books, such as the Handbook of Chemistry and Physics, 30th ed. (1947), published by the Chemical Rubber Publishing Co. and in various published periodic table charts, e. g., those published by Merck & Co., Fisher Scientific Co., etc.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A process for the preparation of fluorocarbons wherein carbon is reacted, at a temperature of at least 500° C., with, as the sole source of fluorine for the reaction, a fluoride of a group II–B metal and the resultant fluorocarbon composition is isolated.

2. A process for the preparation of fluorocarbons wherein carbon is reacted, at a temperature of at least 500° C. and in an inert atmosphere, with, as the sole source of fluorine for the reaction, a group II–B metal fluoride and the resultant fluorocarbon composition is isolated.

3. Process of claim 1 wherein the carbon has a total surface area of at least 20 square meters per gram.

4. A process for the preparation of fluorocarbons wherein carbon is reacted, at a temperature of at least 500° C. and in an inert atmosphere, with, as the sole source of fluorine for the reaction, mercury II fluoride and the resultant fluorocarbon composition is isolated.

5. A process for the preparation of fluorocarbons wherein the carbon electrodes of a carbon arc are reacted with mercury II fluoride and the resultant fluorocarbon composition is isolated.

6. The process for the preparation of tetrafluoroethylene wherein carbon is reacted, at a temperature of at least 2500° C., with, as the sole source of fluorine for the reaction, a fluoride of a group II–B metal and the resultant tetrafluoroethylene is isolated.

7. The process for the preparation of tetrafluoroethylene wherein carbon is reacted, at a temperature of at least 2500° C., with, as the sole source of fluorine for the reaction, a fluoride of a group II–B metal, the reaction products are very rapidly quenched, and the resultant tetrafluoroethylene is isolated.

References Cited in the file of this patent

UNITED STATES PATENTS

| Number | Name | Date |
|---|---|---|
| 889,098 | Blackmore | May 26, 1908 |
| 1,861,625 | Driggs et al. | June 7, 1932 |
| 2,456,027 | Simons | Dec. 14, 1948 |
| 2,670,389 | Passino et al. | Feb. 23, 1954 |

OTHER REFERENCES

Allmand: Principles of Applied Electrochemistry, page 528 (1924).